(12) United States Patent
Phillips

(10) Patent No.: US 8,195,501 B2
(45) Date of Patent: Jun. 5, 2012

(54) DYNAMIC INTERACTIVE SURVEY SYSTEM AND METHOD

(76) Inventor: Michael Phillips, Raleigh, NC (US)

(*) Notice: Subject to any disclaimer, the term of this patent is extended or adjusted under 35 U.S.C. 154(b) by 837 days.

(21) Appl. No.: 12/238,217

(22) Filed: Sep. 25, 2008

(65) Prior Publication Data

US 2010/0076816 A1 Mar. 25, 2010

(51) Int. Cl.
*G06Q 10/00* (2006.01)
*G06F 17/30* (2006.01)
(52) U.S. Cl. .................. 705/7.32; 705/304
(58) Field of Classification Search ............... None
See application file for complete search history.

(56) References Cited

U.S. PATENT DOCUMENTS

| | | | | |
|---|---|---|---|---|
| 5,926,794 | A * | 7/1999 | Fethe | 705/7.39 |
| 6,687,560 | B2 * | 2/2004 | Kiser et al. | 700/108 |
| 6,850,866 | B2 | 2/2005 | Couchot et al. | |
| 2002/0091817 | A1 * | 7/2002 | Hill et al. | 709/224 |
| 2007/0127693 | A1 * | 6/2007 | D'Ambrosio et al. | 379/265.06 |

OTHER PUBLICATIONS

Darby, J.; Course evaluations: a tendency to respond "favorably" on scales?; Feb. 1, 2007; Emerald Group Publishing Limited; Quality Assurance in Education, vol. 16, No. 1; pp. 7-18.*

* cited by examiner

*Primary Examiner* — Jason Dunham
*Assistant Examiner* — Ashley Chou
(74) *Attorney, Agent, or Firm* — Hultquist, PLLC; Steven Hultquist

(57) ABSTRACT

A system and methodology for communication between a service provider and a service recipient relating to services is described, such that for a particular task or project, interaction and feedback between the respective service provider and service recipient is provided by the system in a manner that enables service recipient satisfaction to be accurately communicated to the service provider and documented by the service recipient. The system is modifiable and customizable to facilitate communication between a service provider and a service recipient in various industries.

31 Claims, 14 Drawing Sheets

DYNAMIC INTERACTIVE SURVEY SYSTEM AND METHOD

FIELD OF THE INVENTION

The present invention relates to a system and method for communication, e.g., a system and method for medication between a service provider and service recipient, relating to services rendered by the provider to the recipient and providing effective documentation feedback of recipient satisfaction with the provided services. The system and methodology may more generally be directed to communication and feedback between the first and second parties related to selection, satisfaction or attitude of the second party.

DESCRIPTION OF THE RELATED ART

A prevalent problem facing providers of services and service recipients who receive those services is a lack of efficient communication. Inadequate or ineffective communication can cause wasted time and wasted effort when service providers perceive service-related issues differently than their customers/clients, and address the problem in a manner that is not acceptable to the service recipient. In addition to the time, effort and expense involved in rectifying misunderstandings as to the nature and extent of services, service relationships are frequently impaired or even irrevocably damaged when a service provider fails to understand a service recipient's goals, needs, priorities and preferences. Both a service provider and a service recipient would benefit from a system and method for enhanced communication, particularly communication that is directed to the recipients' evaluation of the service, especially when the feedback obtained is collected and utilized to improve performance on a project prior to its completion.

Although systems for delivering and storing customer comments currently exist, and systems for generating feedback through online questionnaires and other online forms of data collection have been developed, there is a lack of effective systems and methods for improving the communication between a service provider and service recipient that use feedback to improve performance.

The present invention addresses this circumstance.

SUMMARY OF THE INVENTION

The present invention relates to a system and methodology for communication between a first party and a second party, e.g., a service provider and a service recipient relating to services, such as may be involved in a particular task or project, with interaction and feedback between the respective service provider and service recipient parties that enables service recipient satisfaction to be accurately communicated to the service provider and documented by the service recipient.

In one aspect, the invention relates to a system for interactive and feedback communication between a service provider and a service recipient concerning a project, said system comprising:
an information management module including at least one project query list that is selectively adjustable by the service provider in respect of type and extent of queries, wherein said queries require responses indicative of service recipient satisfaction with service provided to the service recipient by the service provider in the project;

wherein said information management module is operable to generate and transmit to the service recipient a communication enabling service recipient access to one or more of said at least one project query list,
a graphical user interface communicatively coupled to the information management module and arranged to display a cursor-actuatable slider element that is translatable across a field of graduated query responses of progressively varying service recipient satisfaction or dissatisfaction with services rendered by the service provider to the service recipient in performance of the project;

wherein cursor selection of a specific query response on the field of graduated query responses causes the information management module to store a value corresponding to that specific query response in a compilation of values for all specific query responses, and wherein the information management module is adapted to process said compilation of values for all specific query responses, in response to service provider and/or service recipient request, to generate a service recipient satisfaction report for services rendered by the service provider in performance of the project.

In another aspect, the invention relates to a method of interactive and feedback communication between a service provider and a service recipient concerning a project, said method comprising:

(a) providing a system including:
an information management module including at least one project query list that is selectively adjustable by the service provider in respect of type and extent of queries, wherein said queries require responses indicative of service recipient satisfaction with service provided to the service recipient by the service provider in the project;

wherein said information management module is operable to generate and transmit to the service recipient a communication enabling service recipient access to one or more of said at least one project query list, a graphical user interface communicatively coupled to the information management module and arranged to display a cursor-actuatable slider element that is translatable across a field of graduated query responses of progressively varying service recipient satisfaction or dissatisfaction with services rendered by the service provider to the service recipient in performance of the project;

wherein cursor selection of a specific query response on the field of graduated query responses causes the information management module to store a value corresponding to that specific query response in a compilation of values for all specific query responses, and wherein the information management module is adapted to process said compilation of values for all specific query responses, in response to service provider and/or service recipient request, to generate a service recipient satisfaction report for services rendered by the service provider in performance of the project;

(b) actuating the system to generate and transmit to the service recipient a communication enabling service recipient access to one or more of said at least one project query list;

(c) compiling values for all specific query responses in said information management module; and (d) generating said service recipient satisfaction report.

A further aspect of the invention relates to a method of interactive communication between a service provider and a service recipient relating to a project involving services rendered by the service provider to the service recipient, said method comprising:

providing an information management module that is selectively actuatable by the service provider to communicate an industry-specific survey to the service recipient, wherein said information management module is arranged to permit the service provider to optionally customize the survey for a specific project type;

actuating the information management module to communicate a survey for the project, or an access link thereto, to the service recipient, wherein the survey as accessed by the service recipient is presented by a graphical user interface including a cursor-actuatable slider element that is translatable across a field of graduated query responses of progressively varying service recipient satisfaction or dissatisfaction with services rendered by the service provider to the service recipient in performance of the project, and from which a specific query response is cursor-selectable by the service recipient on said field, to cause the information management module to store a value corresponding to that specific query response in a compilation of values of all specific query responses, and to generate a service recipient satisfaction report correlative to said specific query responses.

In yet another aspect, the invention relates to a method of interactive communication between a service provider and a service recipient, comprising electronically transmitting a services-related survey to a display of a digital information processing device of the service recipient and presenting said survey on said display in a graphical user interface including a user-translatable slider arranged to slidably traverse a field of graduated query responses of said survey that are correlative of service recipient satisfaction with service provided by the service provider, and that are selectable with positioning of the slider on a selected one of said graduated query responses, to provide a service recipient satisfaction-correlated query response to a query of the survey.

A further aspect of the invention relates to a system for interactive and feedback communication between a first party and a second party, said system comprising:

an information management module including at least one query list that is selectively adjustable by the first party in respect of type and extent of queries, wherein said queries require responses indicative of selection, satisfaction or attitude of the second party;

wherein said information management module is operable to generate and transmit to the first party a communication enabling second party access to one or more of said at least one query, a graphical user interface communicatively coupled to the information management module and arranged to display a cursor-actuatable slider element that is translatable across a field of graduated query responses of progressively varying character indicative of selection, satisfaction or attitude of the second party;

wherein cursor selection of a specific query response on the field of graduated query responses causes the information management module to store a value corresponding to that specific query response in a compilation of values for all specific query responses, and wherein the information management module is adapted to process said compilation of values for all specific query responses, in response to first party and/or second party request, to generate a report correlative of selection, satisfaction or attitude of the second party.

Other aspects, features and embodiments of the invention will be more fully apparent from the ensuing disclosure and appended claims.

BRIEF DESCRIPTION OF THE DRAWINGS

FIG. 2 through FIG. 13 depict screen shots of one embodiment of the dynamic interactive survey system of the invention.

DETAILED DESCRIPTION OF THE INVENTION, AND PREFERRED EMBODIMENTS THEREOF

Figure 1:
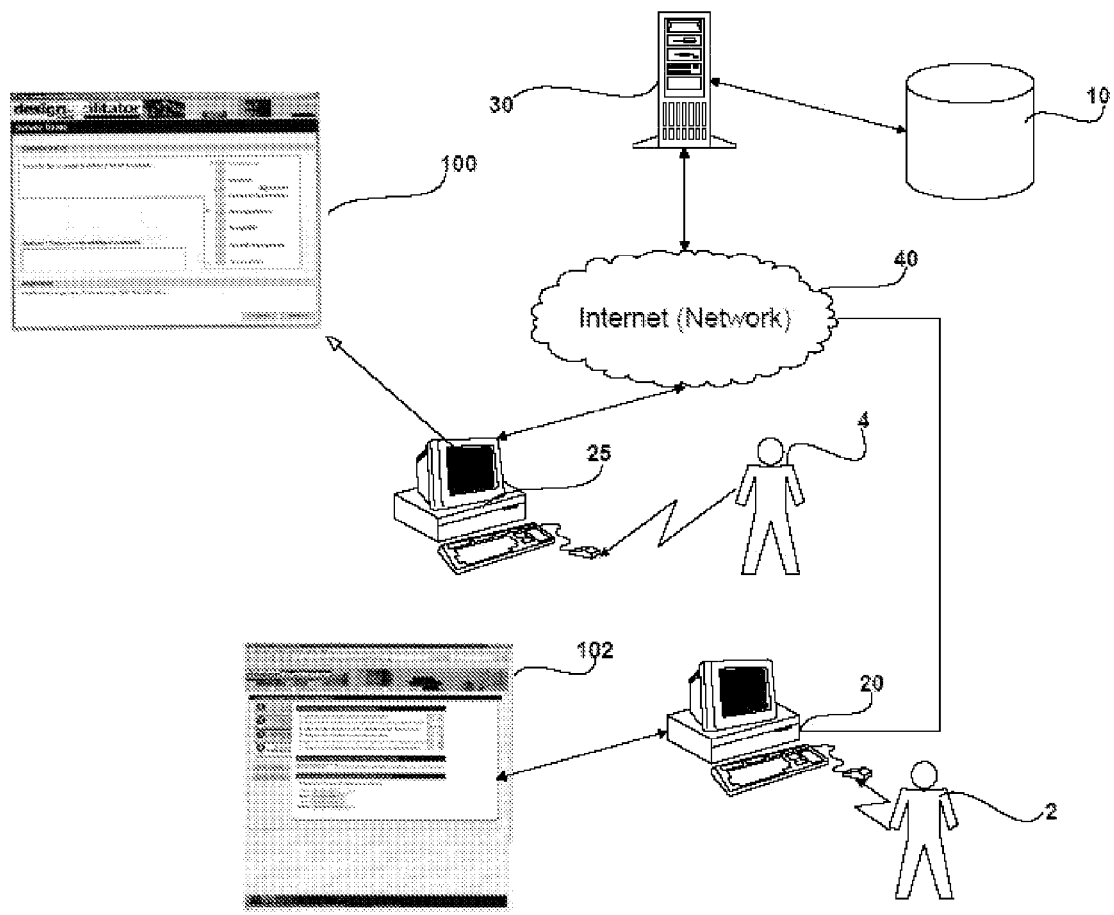
FIG. 1 is a simplified drawing of service provider and a service user utilizing a dynamic interactive survey system according to one embodiment of the present invention, to facilitate communication.

The present invention relates in a broad aspect to a system and method for interactive communication and feedback between a first party and a second party.

The invention in one aspect relates to a system for interactive and feedback communication between a first party and a second party, such system comprising:

an information management module including at least one query list that is selectively adjustable by the first party in respect of type and extent of queries, wherein said queries require responses indicative of selection, satisfaction or attitude of the second party;

wherein said information management module is operable to generate and transmit to the first party a communication enabling second party access to one or more of said at least one query, a graphical user interface communicatively coupled to the information management module and arranged to display a cursor-actuatable slider element that is translatable across a field of graduated query responses of progressively varying character indicative of selection, satisfaction or attitude of the second party;

wherein cursor selection of a specific query response on the field of graduated query responses causes the information management module to store a value corresponding to that specific query response in a compilation of values for all specific query responses, and wherein the information management module is adapted to process said compilation of values for all specific query responses, in response to first party and/or second party request, to generate a report correlative of selection, satisfaction or attitude of the second party.

The present invention relates in one aspect to a system and method for communication between a service provider and service recipient. The system and method of the present invention involve a dynamic interactive survey system that facilitates communication between a service provider and a service recipient regarding services rendered by the provider to the recipient. Effective documentation feedback is achieved through a computer implemented system utilized by the service provider to query the service recipient, as to the recipient's satisfaction with the provided services.

The present invention is described hereinafter in detail with reference to the drawings, which provide as illustrative examples of the invention in various embodiments thereof. Accordingly, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted as unnecessary to the understanding of the invention. Further, the invention as described herein is intended to encompass present and future known equivalents to the known components illustratively described herein. It will be appreciated that the invention has broad applicability in many fields of endeavor, in which service is provided and feedback is desired and/or useful to improve the performance of such service. Industries in which the present invention may have utility in specific applications include, but are not limited to, engineering, software development, IT services, boating/marine repair and design, product design, legal and financial services, architecture, and interior design.

The advantages and features of the invention are therefore illustrated with reference to the following illustrative embodiments, which are not to be construed as in any way limiting the scope of the invention, but rather as illustrative of possible embodiments of the invention in specific applications thereof.

FIG. 1, schematically depicts one embodiment of a dynamic interactive survey system, in accordance with one embodiment of the invention. As shown, a service provider 2 uses a remote computer terminal 20 connected through a computer network (e.g., the internet) 40 to access the information management module of the survey system that is running on a server 30 and stored on a local database 10. The service provider computing systems 20 and 25, and server 30, can comprise any combination of computers, PDAs, terminals, monitors and display systems useful to present information to one or more persons. Local database 10 can comprise any computer readable medium capable of storing text and graphics. For the purposes of discussion, the computing systems 20 and 25, server 30, and local database 10, will be described as operating via a network to provide the screen displays 100 and 102 of the interactive survey system. The service provider may access the survey system through a website on a remote server 30 as in the configuration displayed by FIG. 1., or in another aspect the survey system is capable of being installed on a server that is part of a local area network, or alternatively the survey system is capable of being stored on a computer readable medium and accessed via a local access device.

Figure 2:
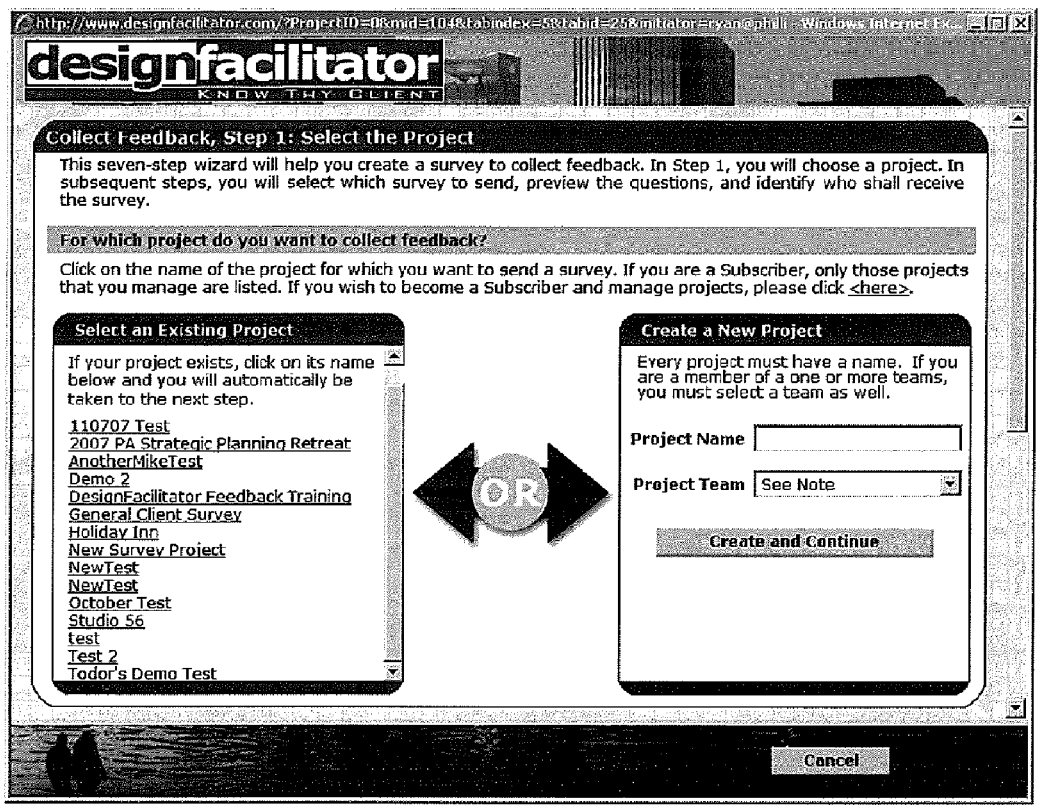

As shown in FIG. 1, the survey system and method of communication of the present invention provides the service provider 2 the opening screen of the information management module displayed in the screenshot depicted in FIG. 2 upon actuating the system. As depicted in FIG. 2, the interactive survey system provides the service provider an option to select from an existing ongoing project and query results or to create a new project. The survey system in this manner is operable to create a customized survey with a query list for the service recipient 4 regarding the performance of the service provider 2 across multiple ongoing projects or on an entirely new project.

Figure 3:
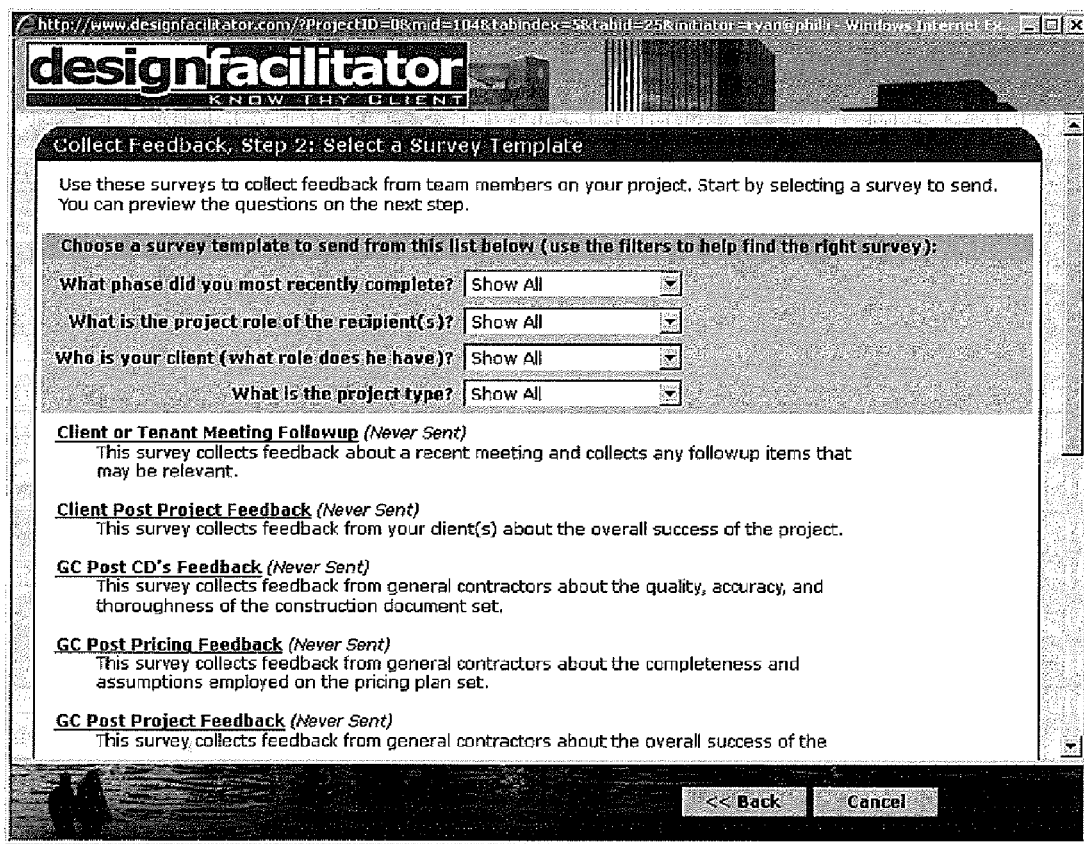

As depicted by the screenshot in FIG. 3, the information module provides the service provider 2 the choice of selecting an existing industry-specific template with prebuilt query lists applicable to industry specific projects, in order to quickly focus the feedback from the service recipient 4 and improve communication. Additionally, the system and information module are preferably constructed and arranged to be fully customizable to create novel templates and query lists to add to the survey system.

Figure 4:
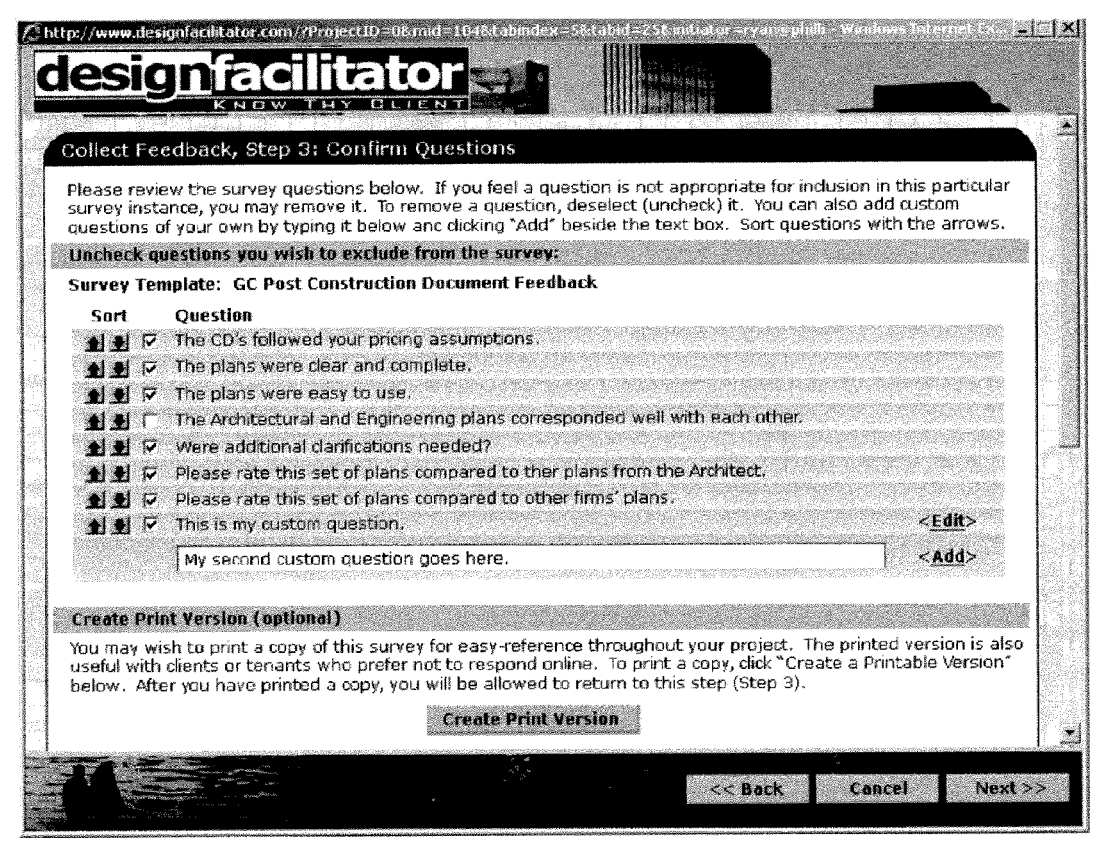

In the subsequent operation, as shown by the screenshot in FIG. 4, the information management module of the system displays a listing of the queries on the project query list, thereby providing the service provider the opportunity to configure the order and the content of the list. The query list is fully modifiable, allowing the service provider to add, delete, or edit the individual queries as is necessary to obtain the feedback that will be of the greatest benefit to the completion and improvement of the services provided in the performance of the project.

Figure 6:
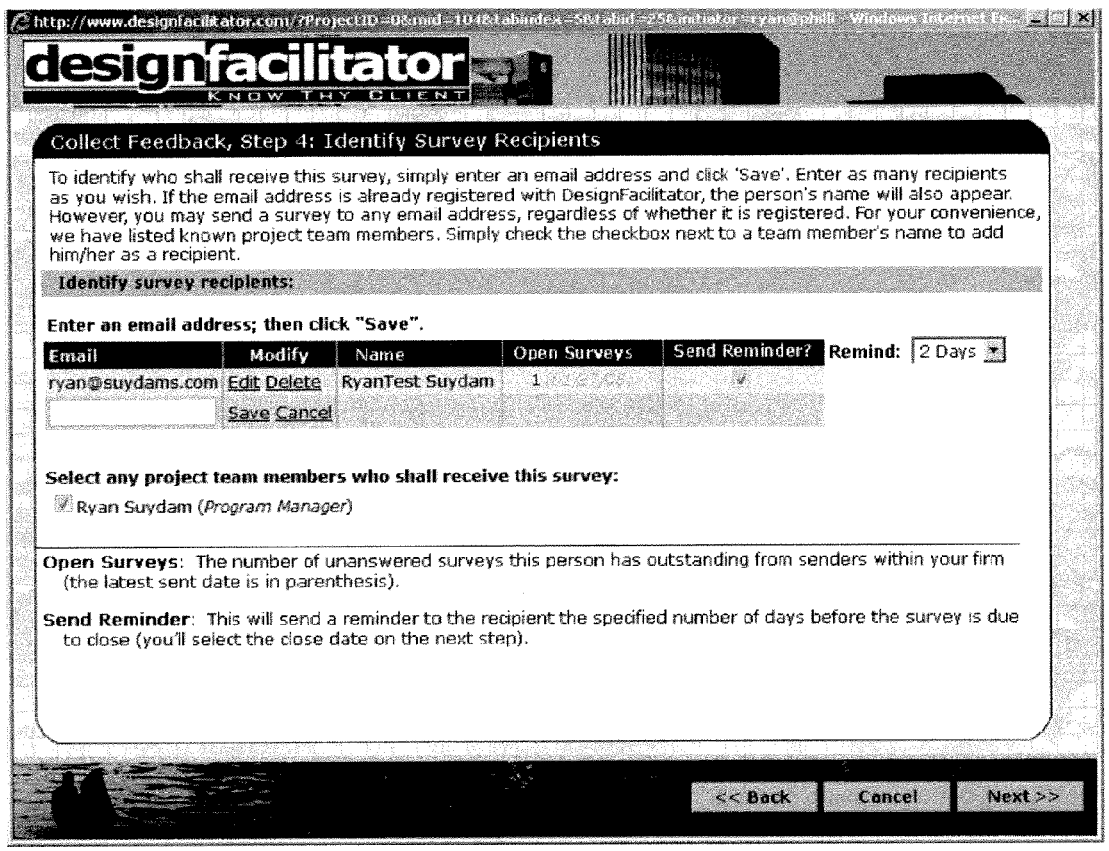

As shown by the screenshot depicted in FIG. 6, the information module of the system is configurable by the service provider 2 to identify the service recipient(s) 4. The information module provides a display depicting the email address, name, number of unanswered query lists, and an option for reminding a service recipient of any unanswered query lists. In the description of the invention herein, the term "query list" is used interchangeably with the term "survey." As shown by FIG. 4, the system is fully configurable to add, delete, or edit the number, identity, and email address of the survey recipient(s) 4.

The information module is configured to store the displayed service recipient information in a database. The system depicted in FIG. 6 has also been configured to allow the survey provider the option of designating additional service providers to receive the query list. The system is also modifiable to set a time period in which to remind a service recipient of any unanswered query lists (surveys).

Figure 7:
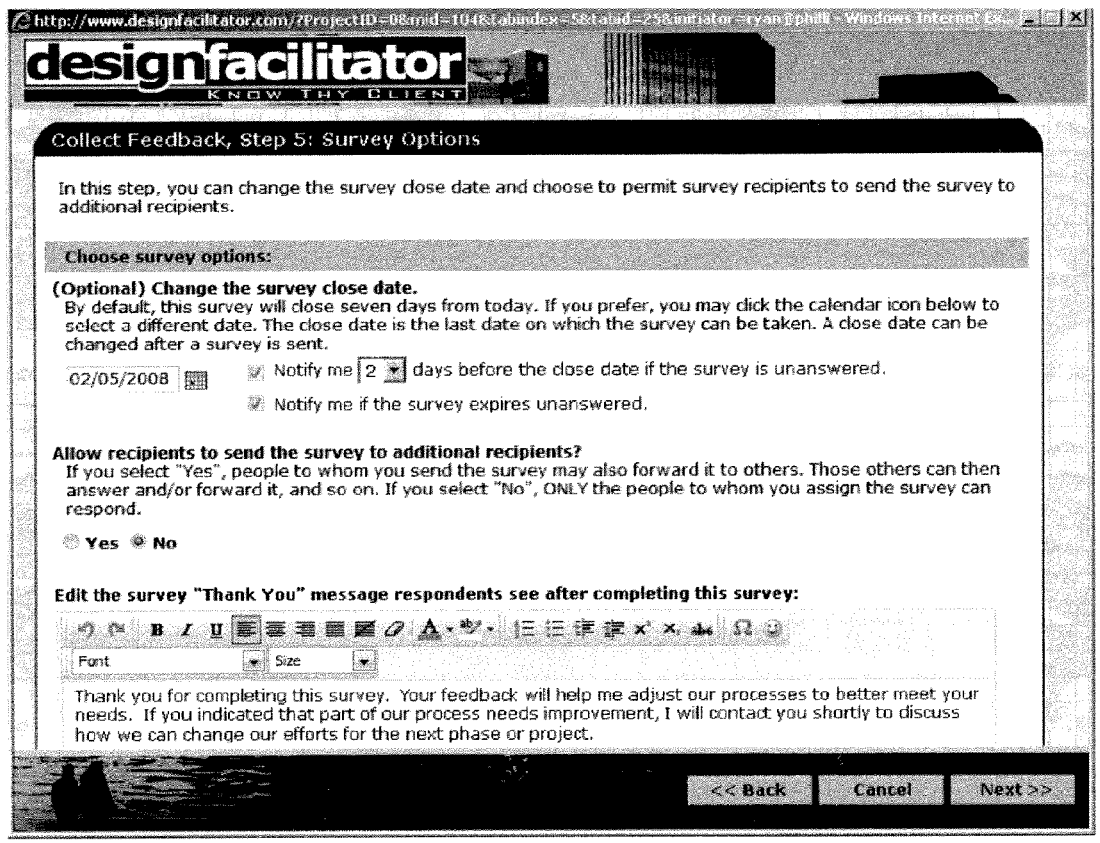
Figure 8:
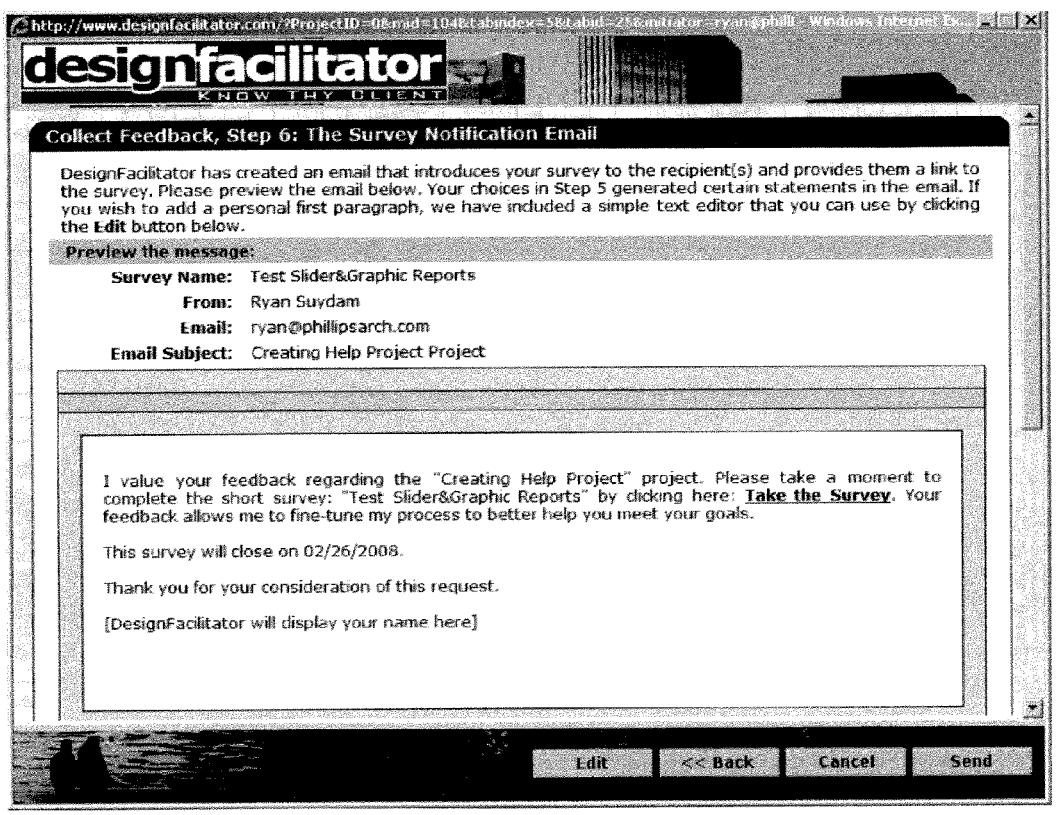

As shown by the screenshot depicted in FIG. 7, the information module of the system provides the service provider the option of modifying the closing date for the project query list (survey). The system also provides the service provider 2 the option to permit the service recipient 4 the choice of forwarding the project query list (survey) to additional service recipients that have not been identified and assigned by the service provider. The screenshot depicted in FIG. 7 also displays the text editor interface that provides the service provider the opportunity to modify, edit, or add to the "thank you" message that the system is configured to send to the service recipients after the service recipient has responded The screenshot depicted in FIG. 8 displays the final step in the creation of a project query list, prior to the system sending the project query list to the identified service recipient(s). As shown in FIG. 8, the information module of the system is configured to allow the service provider to review and edit the project list notification email that will provide feedback to the service recipient and provide access via a graphical user interface that is communicably linked to the project list query. In one embodiment, the graphical user interface includes an embedded hyperlink, but any interface that is capable of being stored as text or a graphic in an email can be used.

Figure 9:
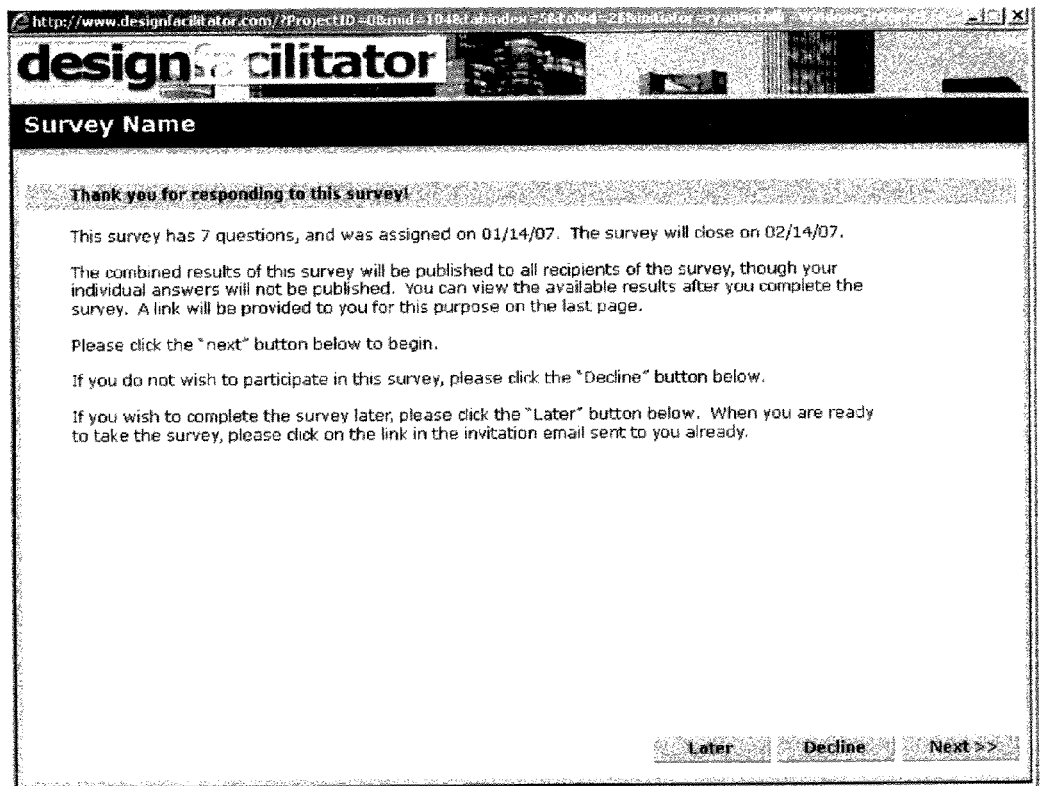

FIG. 9 depicts the screenshot of the opening page of the project query list that is displayed to a survey recipient 4 upon actuating the graphical user interface linked to the project query list. The system is configurable to provide the service recipient the option to decline to display the project query list or to postpone the display to a later time.

Figure 5:
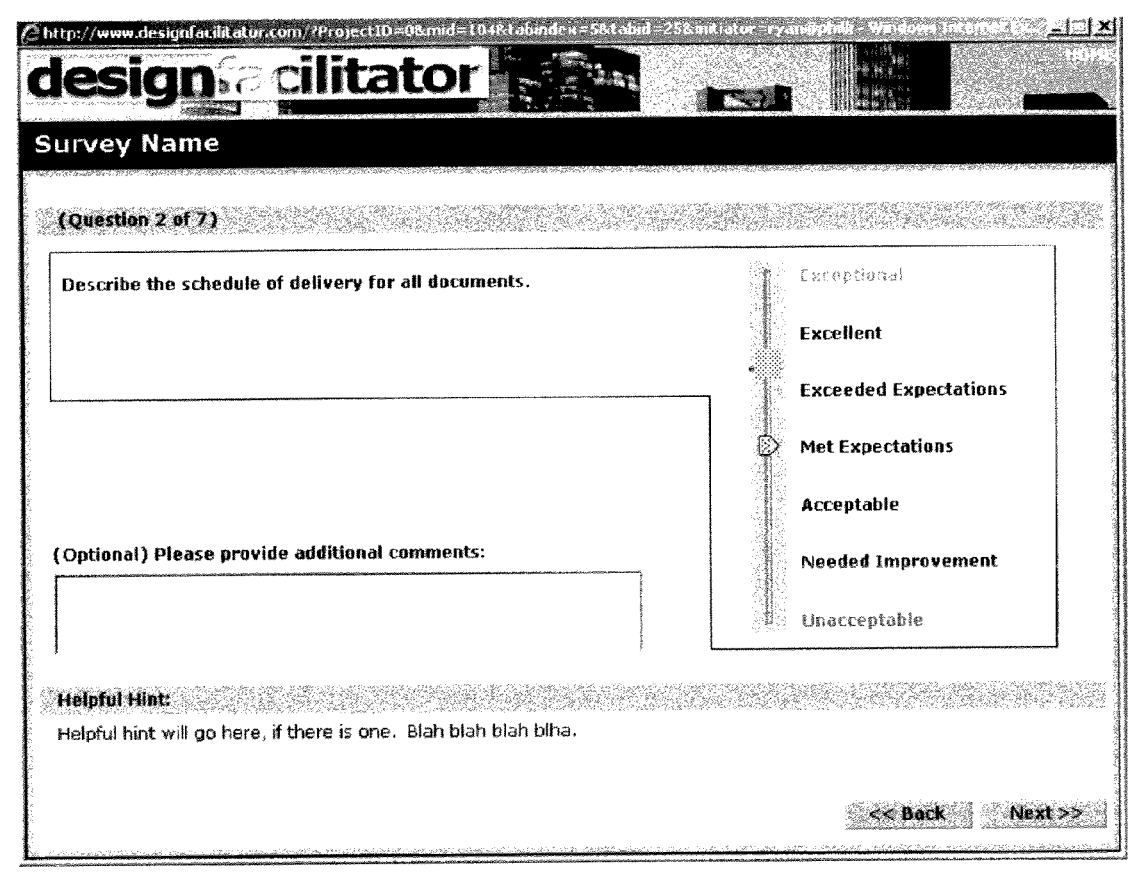

The screenshot depicted in FIG. 5 displays an individual query (number 2 of 7) from a project query list and also displays the unique graphical user interface that is coupled to the information management module to record the service recipient's response to the query. The graphical user interface has a cursor-actuable slider element that moves across an illustrated field that is displayed adjacent to a number of graduated query responses. The query responses are displayed in textual forms that describe progressively varying service recipient satisfaction or dissatisfaction (depending on the direction of movement of the cursor-actuated slider) with the services that have been rendered by the service provider.

When the service recipient actuates the graphical user interface to select a position on the field corresponding to a specific query response, the information module stores a value associated with that specific query response in a database that stores the compilation of values for all of the specific query responses. As displayed in the screenshot in FIG. 5, the system provides the service recipient a space to input text commenting on the specific query. The service recipient's comment is also associated with that specific project query and stored by the information module of the system for retrieval when a service recipient satisfaction report is requested by the service provider. The text format of the queries is modifiable and the additional space for service recipient comment may also be added or deleted for a specific query by the service provider.

Figure 11:
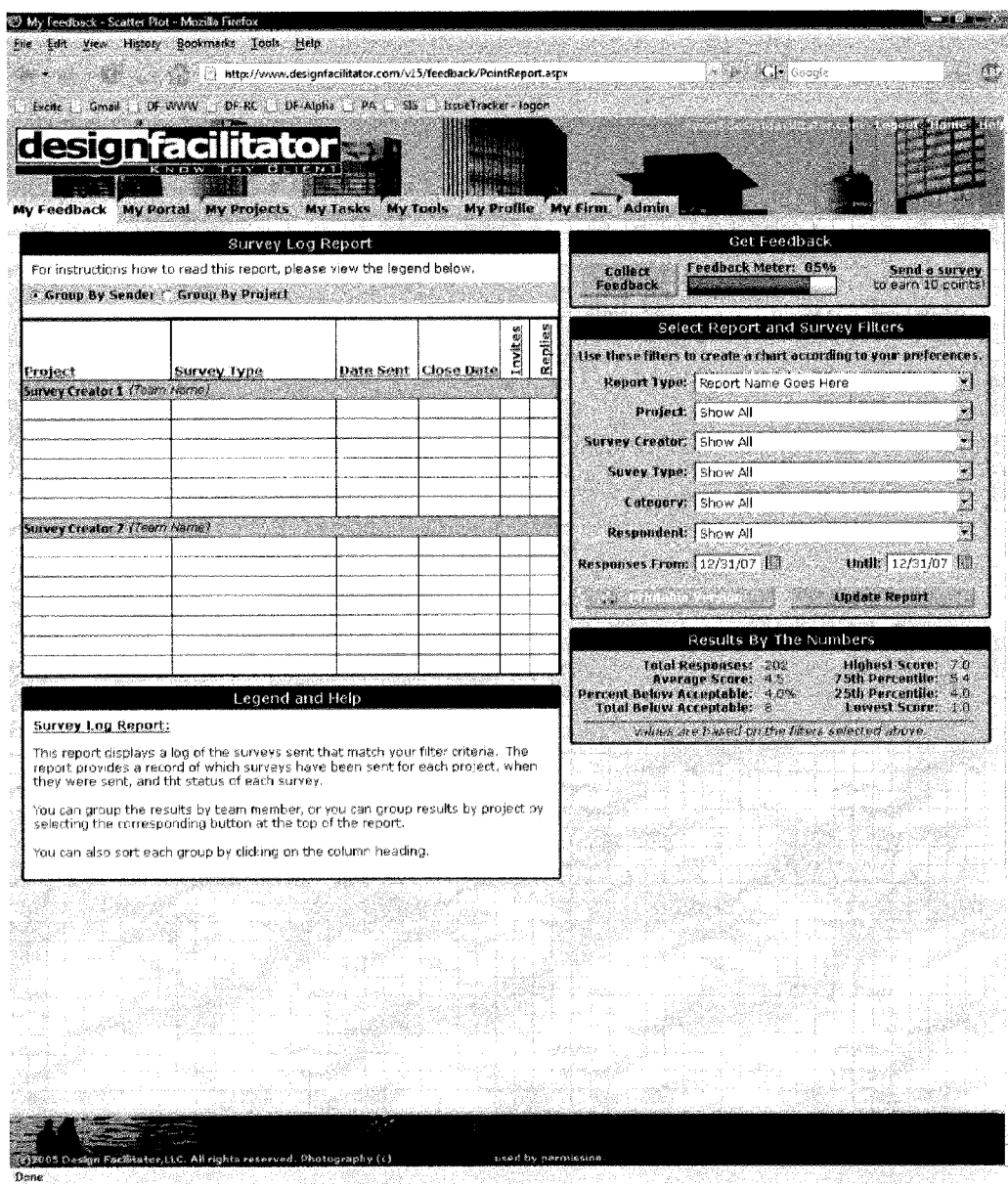
Figure 12:
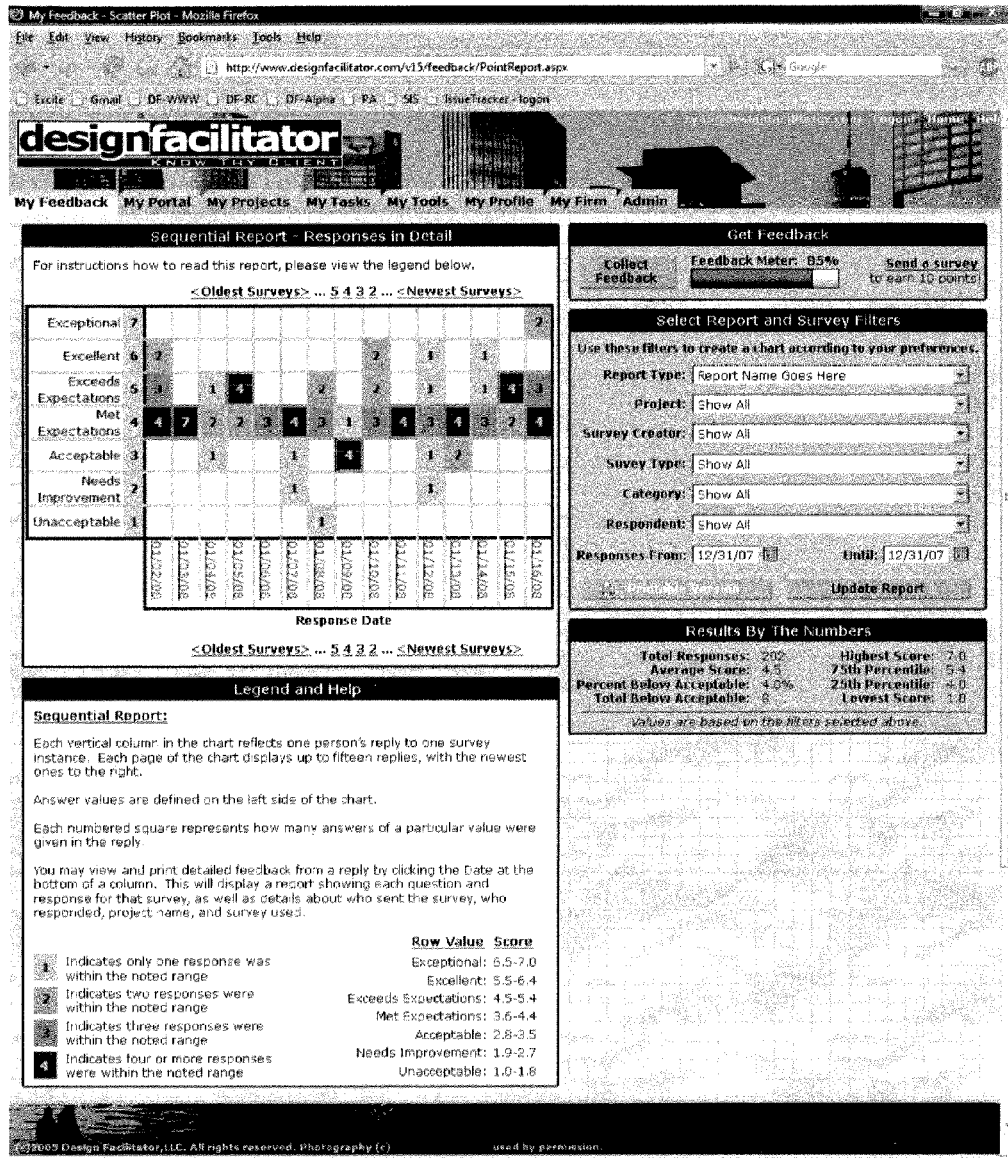
Figure 13:
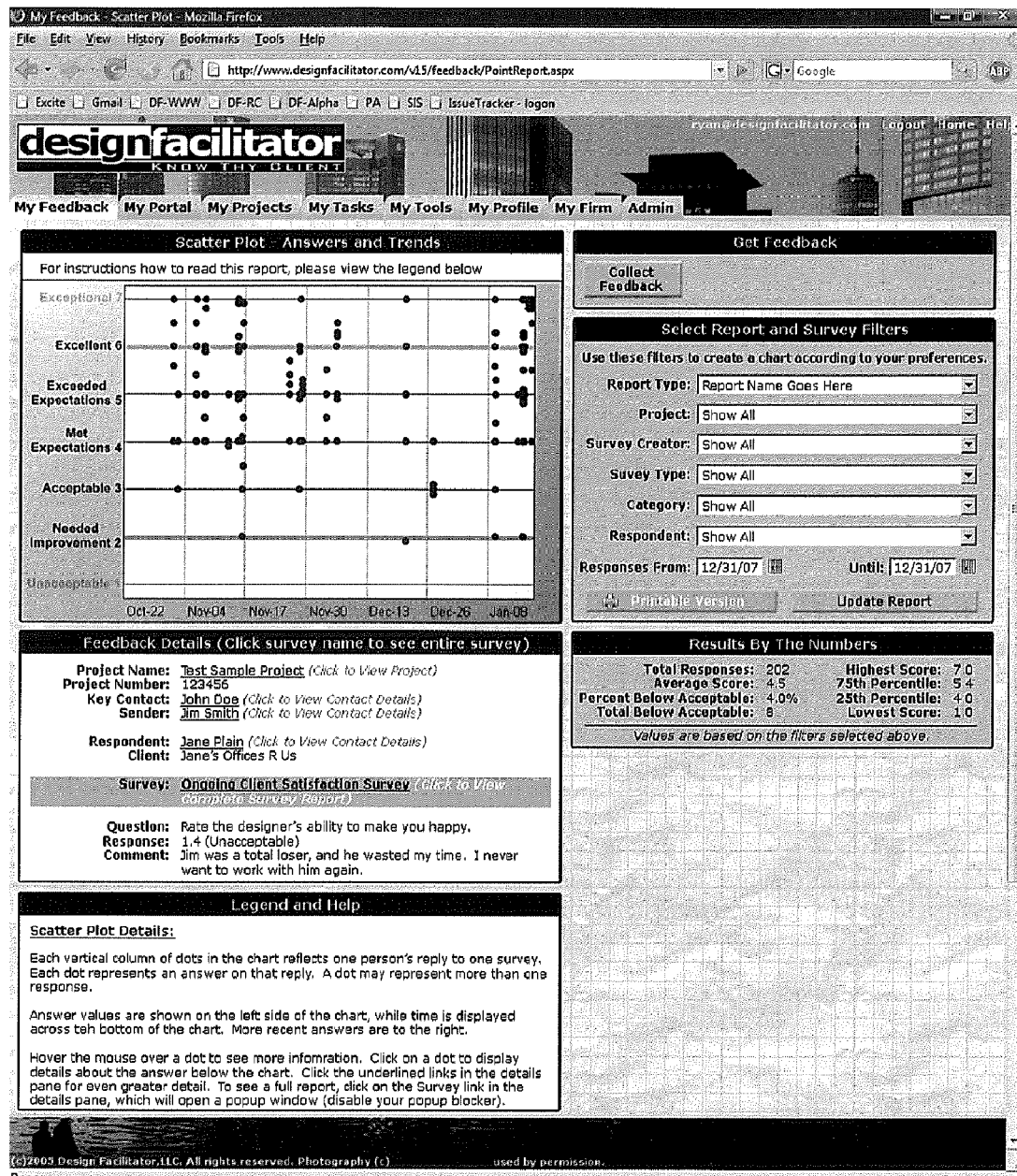

The screenshots depicted in FIGS. 11, 12, and 13 are illustrative examples of reports that can be compiled and generated by the information management module of the system for the service provider. The information management module of the system is configurable to display reports in various graphical illustrations that include specific feedback values received from responses to the project list queries. The information management module is also configurable to provide the service provider with access to stored query responses and generate reports that include historical response values in conjunction with current response values in graphical formats.

In this manner the service provider is provided with ongoing and current feedback from the service recipient regarding the service recipient's satisfaction level for a project or individual task(s). The dynamic interactive survey system and method of the present invention thus is usefully employed to improve communications between a service provider and a service recipient, e.g., by identifying which aspects of the service provider's performance are not meeting the expectations and needs of the service recipient.

As depicted in the screenshot displayed in FIG. 11, the information management module of the system is advantageously configured to store an electronic logbook of the service provider's comments and to allow the service provider to search the database of project query lists and responses, to generate a corresponding report. The information management module is usefully configured to display a report of query list responses based on a variety of filters, including report type, project, query list (survey) creator, query list (survey) type, respondent, services recipient, and/or all responses made during a specific time period. The feedback reports of the present invention are sometimes also referred to as service recipient satisfaction reports.

Figure 10:
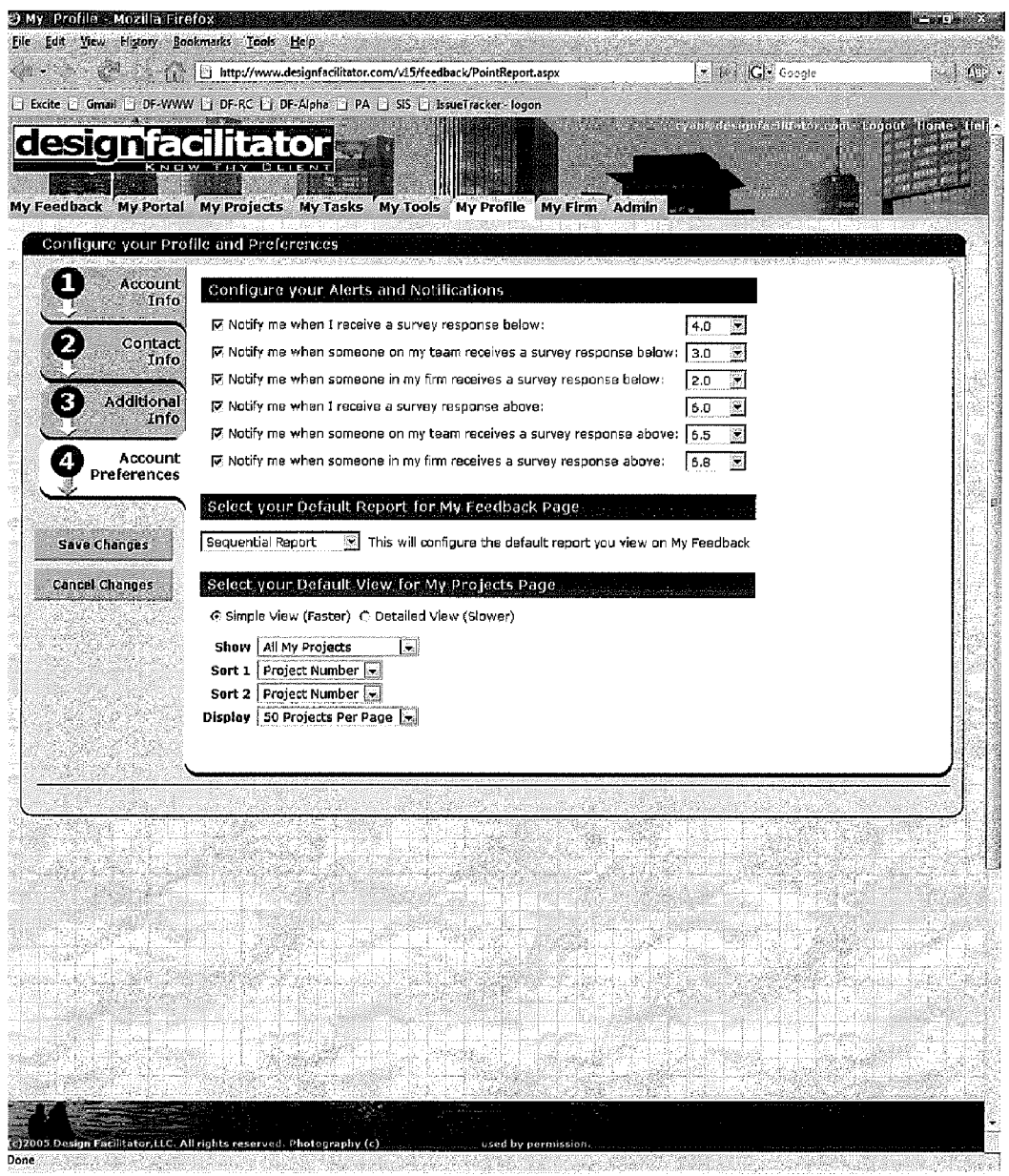

As depicted in the screen shot depicted in FIG. 10, the information management module of the system is configurable to provide a service provider with a profile and account that are stored in the system. The system maintains discrete accounts for each service provider that are accessible by the specific service provider who established the account. The information management module of the system may be modified by the service provider to configure the service provider's account to send an electronic communication to the service provider if a query response is recorded that meets a preset criterion. In this manner, the system provides a system and method for rapid communication between the service provider and the service recipient regarding the performance of the service provider on a specific task or undertaking of a project.

Figure 14:
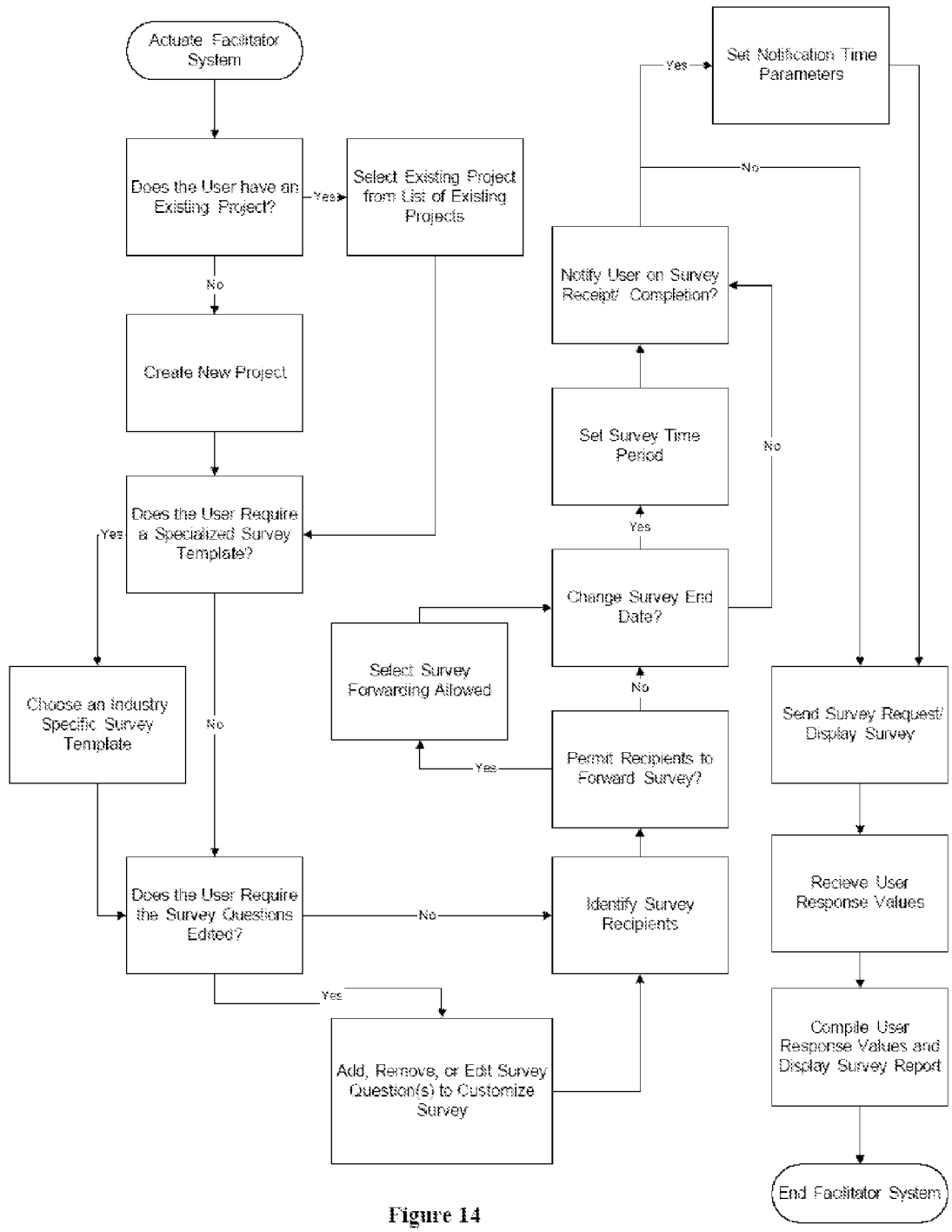
FIG. 14 is a flowchart of a portion of an information management module of a dynamic interactive survey system according to one embodiment of the invention.

FIG. 14 depicts a flowchart of the information module of the dynamic interactive survey system of the invention, in one embodiment thereof. In reference to FIG. 14 and the drawing of FIG. 1, the system is configured by the service provider 2 to transmit a communication to a service recipient 4 (or multiple recipients) that provides the service recipient 4 with access to a pre-built or customized project query list.

The project query list is configurable by the service provider to display a set of predetermined queries, e.g., industry-specific and/or customized queries. The service recipient 4 in this embodiment accesses the project query list (survey) via remote computer 25. The system is configured to record the responses of the service recipient to the queries in a database. The service recipient responds to the project query list through a graphical user interface that is communicatively coupled to the information management module via the internet (or other computer or digital communications network).

The graphical user interface of the system displays to the service recipient a cursor-actuatable slider element that is translatable across a field of graduated query responses of progressively varying degree representing the service recipient's satisfaction or dissatisfaction with the services rendered. The service recipient 4 records responses to the query list by moving the slider element to the appropriate response via the graphical user interface. The field of graduated query responses in one embodiment of the invention includes a linear track along which the slider element is translated by action of a cursor. The service recipient in one arrangement positions a cursor on the slider element by action (clicking) of an associated mouse coupled to the central processor unit associated with the display, and then drags the slider element to the appropriate position on the track that corresponds to the service recipient response.

Release of the slider element then may be utilized to transmit the user response to the information management module. Alternatively, a further mouse click can be employed to "fix" the user response. The linear track constituting the field of graduated query response in such embodiment of the invention may be positioned vertically in orientation, so that the slider element is translated vertically along the track. In one preferred embodiment, the mid-region of the linear track is marked or otherwise identified by suitable indicia to indicate a neutral response to queries presented to the service recipient, e.g., a non-favorable, non-disfavorable response, or alternatively a "meets expectations" response.

The indicia on the linear track thus may have positive, progressively more favorable values or indications as the cursor is moved from the mid-region upwardly to the uppermost terminus of the track, and negative, progressively less favorable values or indications as the cursor is moved from the mid-region downwardly to the lowermost terminus of the track. It has been found that such arrangement of the graduated query response field and slider element associated therewith is particularly conducive to elicitation of responses from the survey recipient, as a kinesthetic operation by such survey recipient.

FIG. 5 and element 100 of FIG. 1 display a screen shot of the cursor actuable slider element and a sample project query. The response is recorded by the information management module in a database as a value associated with that specific query. The information management module is also configured to enable the service provider to access stored query response values and comments, and to generate reports, which may for example be in the form of graphical illustrations of the recorded responses.

The generated reports thus facilitate communication between the service recipient and the service provider, providing a definite, e.g., quantitative, measure of a service recipient's satisfaction with services furnished by a services provider. By use of a graduated field on which the slider is used to positionally input a service recipient's satisfaction, a meaningful feedback can be provided to the service provider during and/or subsequent to rendered services, so that remedial action can be taken to enhance the service recipient's satisfaction with the provided services.

As indicated, the service recipient's responses to survey questions can be utilized to trigger a report to the service provider, when one or more queries from the survey is answered in a manner that initiates such trigger action. Alternatively, key questions of the survey can be used to form a critical response index, such as for example when the average numerical value of such responses on a zero to 10 scale falls below 85%, which may initiate the generation of a report to the service provider that attention to the project is immediately needed, so that the critical index average value is increased by such attention and remedial action to a value of at least 85%.

In like manner, the survey responses can be used to "grade" an overall project, or specific tasks of a project, and predetermined grading criteria may be employed to trigger reports when the survey indicates that attention is required, e.g., to fix a specific aspect of the project, to increase the level of interaction with the service recipient, or to take such other action as may be warranted under the circumstances, consistent with the triggered report.

While the invention has been described in terms of a "service provider" and "service recipient," it will be understood that the system and method of the invention are more generally applicable to a variety of commercial transactions, as well as political polling, focus group qualification of products, computer dating, on-line auctions, and a plethora of other implementations, in which feedback between a first party and a second party is useful to achieve successful action or circumstances. The first party of second party in such interaction may be single individuals, or groups, agencies, institutions, organizations, etc. and the subject matter of the communication and feedback may relate to selection, satisfaction or attitude of the second party.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. One or more computer-readable media storing non-transitory instructions, wherein the instructions are executable by a computer system for providing interactive and feedback communication between a service provider and a service recipient concerning a project, said computer-readable medium comprising:

an information management module storing non-transitory instructions including at least one project query list that is selectively adjustable by the service provider in respect of type and extent of queries, wherein said queries require responses indicative of service recipient satisfaction with service provided to the service recipient by the service provider in the project;

a graphical user interface comprising a second plurality of non-transitory instructions stored on the one or more computer-readable media, the graphical user interface being communicatively coupled to the information management module and arranged to display a cursor-actuatable slider element that is translatable across a field of graduated query responses of progressively varying service recipient satisfaction or dissatisfaction with services rendered by the service provider to the service recipient in performance of the project;

wherein the field of graduated query responses comprises a linear track along which the slider element is translated by action of a cursor, and wherein indicia on the linear track may have positive, progressively more favorable values or indications as the cursor is moved from a mid-region upwardly to an first terminus of the track having a most favorable response, and negative, progressively less favorable values or indications as the cursor is moved from the mid-region to a second terminus of the track having a least favorable response, wherein cursor selection of a specific query response on the field of graduated query responses causes the information management module to store a value corresponding to that specific query response in a compilation of values for all specific query responses, and wherein the information management module is adapted to be operated by:

(a) actuating the information management module to generate and transmit to the service recipient a communication enabling service recipient access to one or more of said at least one project query list;

(b) processing said compilation of values for all specific query responses, in response to service provider and/or service recipient request; and (c) generating a service recipient satisfaction report for services rendered by the service provider in performance of the project.

2. The one or more computer-readable media of claim 1, wherein the information management module is arranged to generate the services recipient satisfaction report in a graphical format.

3. The one or more computer-readable media of claim 1, wherein the information management module is arranged to generate and transmit to the service provider a communication if a query response value satisfies a predetermined criterion.

4. The one or more computer-readable media of claim 1, wherein the information management module is arranged to store all service recipient query response values in a searchable database.

5. The one or more computer-readable media of claim 4, wherein the information management module is arranged to generate a services recipient satisfaction report in a graphical format from the searchable database.

6. The one or more computer-readable media of claim 1, wherein the information management module is arranged to transmit the at least one project query list by email to the service recipient.

7. The one or more computer-readable media of claim 6, wherein the information management module is arranged to receive and compile service recipient query responses from an email.

8. The one or more computer-readable media of claim 1, wherein the service recipient satisfaction report comprises a scatter plot of service recipient query responses.

9. The one or more computer-readable media of claim 1, wherein the information management module is arranged to permit a receiver of a project query list to forward the project query list to others, at least one of whom is the service recipient.

10. The one or more computer-readable media of claim 1, where the information management module is arranged to allow the service provider to restrict or permit access to the project query list by the service recipient for only a predetermined time period.

11. The one or more computer-readable media of claim 1, wherein the service provider is an architect or a designer.

12. The one or more computer-readable media of claim 1, wherein the project comprises architectural design of a building or a building interior space.

13. A computer-implemented method of interactive and feedback communication between a service provider and a service recipient concerning a project, said method comprising:
   (a) providing a system including:
   an information management module comprising a plurality of non-transitory computer-executable instructions stored on a computer-readable medium, the plurality of computer-executable instructions including at least one project query list that is selectively adjustable by the service provider in respect of type and extent of queries, wherein said queries require responses indicative of service recipient satisfaction with service provided to the service recipient by the service provider in the project;
       wherein said information management module is operable to generate and transmit to the service recipient a communication enabling service recipient access to one or more of said at least one project query list,
   a graphical user interface comprising a second plurality of non-transitory instructions stored on the one or more computer-readable media, the graphical user interface being communicatively coupled to the information management module and arranged to display a cursor-actuatable slider element that is translatable across a field of graduated query responses of progressively varying service recipient satisfaction or dissatisfaction with services rendered by the service provider to the service recipient in performance of the project;
       wherein the field of graduated query responses comprises a linear track along which the slider element is translated by action of a cursor, and wherein indicia on the linear track have positive, progressively more favorable values or indications as the cursor is moved from a mid-region upwardly to a first terminus of the track having a most favorable response, and negative, progressively less favorable values or indications as the cursor is moved from the mid-region to a second terminus of the track having a least favorable response,
       wherein cursor selection of a specific query response on the field of graduated query responses causes the information management module to store a value corresponding to that specific query response in a compilation of values for all specific query responses, and wherein the information management module is adapted to process said compilation of values for all specific query responses, in response to service provider and/or service recipient request, to generate a service recipient satisfaction report for services rendered by the service provider in performance of the project;
   (b) actuating the system to generate and transmit to the service recipient a communication enabling service recipient access to one or more of said at least one project query list;
   (c) compiling values for all specific query responses in said information management module; and
   (d) generating said service recipient satisfaction report.

14. The computer-implemented method of claim 13, wherein the service provider is an architect.

15. The computer-implemented method of claim 13, wherein the service provider is a designer.

16. The computer-implemented method of claim 13, wherein the information management module is arranged to transmit an e-mail to the service provider if specific query response value(s) of the service recipient satisfy a predetermined criterion.

17. The computer-implemented method of claim 13, wherein the project comprises architectural design of a building or a building interior space.

18. The computer-implemented method of claim 13, wherein the information management module is arranged to generate and transmit multiple project query lists to said service recipient.

19. The computer-implemented method of claim 13, wherein the information management module is arranged to generate service recipient satisfaction reports in graphical format(s) to the service provider and service recipient.

20. The computer-implemented method of claim 13, wherein the information management module is arranged to store all service recipient query response values in a searchable database.

21. The computer-implemented method of claim 13, wherein the information management module is arranged to compile and store a searchable database of service recipient information.

22. The computer-implemented method of claim 13, wherein the information management module is arranged to compile and store a searchable database of project information.

23. A computer-implemented method of interactive communication between a service provider and a service recipient relating to a project involving services rendered by the service provider to the service recipient, said method comprising:
   (a) providing an information management module comprising a plurality of non-transitory computer-executable instructions stored on a computer readable medium and executable on a computer system that is selectively actuatable by the service provider to communicate an industry-specific survey to the service recipient, wherein said information management module is arranged to permit the service provider to optionally customize the survey for a specific project type;
   (b) actuating the information management module to communicate a survey for the project, or an access link thereto, to the service recipient, wherein the survey as accessed by the service recipient is presented by a graphical user interface including a cursor-actuatable slider element that is translatable across a field of graduated query responses of progressively varying service recipient satisfaction or dissatisfaction with services rendered by the service provider to the service recipient in performance of the project, and from which a specific query response is cursor-selectable by the service recipient on said field, wherein the field of graduated query responses comprises a linear track along which the slider element is translated by action of a cursor;
   (c) compiling values for all specific query responses; and
   (d) generating a service recipient satisfaction report correlative to said specific query responses.

24. The computer-implemented method of claim 23, wherein said service recipient satisfaction report is transmitted by the information management module to the service provider and the service recipient.

25. A computer-implemented method of interactive and feedback communication between a service provider and a service recipient, comprising:

(a) electronically generating a services-related survey using computer-executable instructions including a query list relating to services rendered by the service provider to the service recipient, that is selectively adjustable by the service provider in respect of type and extent of queries, wherein said queries require responses indicative of service recipient satisfaction with services rendered by the service provider to the service recipient, and transmitting the services-related survey to a display of a digital information processing device of the service recipient enabling service recipient access to the survey on said display in a graphical user interface generated by a computer system from a plurality of non-transitory computer-executable instructions storing a plurality of instructions including a user-translatable slider arranged to slidably traverse a field of graduated query responses of progressively varying service recipient satisfaction or dissatisfaction with services rendered by the service provider to the service recipient, and that are selectable with positioning of the slider on a selected one of said graduated query responses, wherein the field of graduated query responses comprises a linear track along which the slider is translated by action of a cursor and wherein indicia on the linear track have positive, progressively more favorable values or indications as the cursor is moved from a mid-region upwardly to a first terminus of the track having a most favorable response, and negative, progressively less favorable values or indications as the cursor is moved from the mid-region to a second terminus of the track having a least favorable response;

(b) compiling values in said computer system of said graduated query responses made by cursor selection by the service recipient, as a compilation of values for all query responses; and (c) generating in said computer system from said compilation of values for all query responses, a service recipient satisfaction report.

26. The computer-implemented method of claim 25, wherein service recipient selection of one of said graduated query responses is effected with input of an electronic mouse while the slider is positioned on a selected one of said graduated query responses.

27. The computer-implemented method of claim 25, wherein service recipient selection of one of said graduated query responses is effected with a keyed input while the slider is positioned on a selected one of said graduated query responses.

28. The computer-implemented method of claim 25, wherein service recipient selection of one of said graduated query responses is effected with a voice command while the slider is positioned on a selected one of said graduated query responses.

29. The computer-implemented method of claim 25, further comprising electronically communicating the survey when completed to the service provider.

30. The computer-implemented method of claim 29, wherein said electronically communicating comprises transmission of the survey on a global digital electronic communication network.

31. One or more computer-readable media storing non-transitory instructions executable by a computer system for interactive and feedback communication between a first party and a second party, said one or more computer-readable media comprising:

an information management module storing non-transitory instructions including at least one query list that is selectively adjustable by the first party in respect of type and extent of queries, wherein said queries require responses indicative of selection, satisfaction or attitude of the second party; and a graphical user interface comprising a second plurality of non-transitory instructions stored on the one or more computer-readable media, the graphical user interface being communicatively coupled to the information management module and arranged to display a cursor-actuatable slider element that is translatable across a field of graduated query responses of progressively varying character indicative of selection, satisfaction or attitude of the second party, wherein the field of graduated query responses comprises a linear track along which the slider element is translated by action of a cursor, and wherein indicia on the linear track may have positive, progressively more favorable values or indications as the cursor is moved from a mid-region upwardly to an first terminus of the track having a most favorable response, and negative, progressively less favorable values or indications as the cursor is moved from the mid-region to a second terminus of the track having a least favorable response, wherein the information management module is adapted for:

(a) actuating the information management module to generate and transmit to the second party a communication enabling second party access to one or more of said at least one query;

(b) compiling values for all specific query responses made by the second party by cursor selection on the field of graduated query responses; and (c) generating, in response to first party and/or second party request, a report correlative of selection, satisfaction or attitude of the second party.

* * * * *